United States Patent [19]
Yamada et al.

[11] Patent Number: 5,412,655
[45] Date of Patent: May 2, 1995

[54] MULTIPROCESSING SYSTEM FOR ASSEMBLY/DISASSEMBLY OF ASYNCHRONOUS TRANSFER MODE CELLS

[75] Inventors: Kenji Yamada; Tatsuo Nakagawa, both of Tokyo, Japan

[73] Assignee: NEC Corporation, Tokyo, Japan

[21] Appl. No.: 187,047

[22] Filed: Jan. 27, 1994

[30] Foreign Application Priority Data

Jan. 29, 1993 [JP] Japan ................................. 5-013587
Jan. 29, 1993 [JP] Japan ................................. 5-013613

[51] Int. Cl.⁶ .......................................... H04L 12/56
[52] U.S. Cl. ................... 370/60.1; 370/94.2; 370/99
[58] Field of Search ............ 370/60, 60.1, 79, 82, 370/84, 94.1, 94.2, 99, 100.1, 105.1

[56] References Cited

U.S. PATENT DOCUMENTS 5,237,564  8/1993  Lespagnol et al. ............... 370/60.1
5,239,544  8/1993  Balzano et al. ................... 370/94.2

Primary Examiner—Douglas W. Olms
Assistant Examiner—Melvin Marcelo
Attorney, Agent, or Firm—Foley & Lardner

[57] ABSTRACT

An assembly/disassembly system containing a cell assembly and a cell disassembly, each having one buffer memory with its memory area logically divided into a plurality of data areas (banks). The cell assembly receives TDM data to assemble ATM cells by storing the TDM data into the respective banks according to the virtual channels. When one of the banks stores the TDM data in the payload length of an ATM cell, a new bank (unused bank) is specified to store the TDM data successively. An ATM cell is formed by using the data read out from the bank where the TDM data is stored in the payload length of an ATM cell. The cell disassembly receives ATM cells from the ATM highway to disassemble the ATM cells into TDM data by using the buffer memory. The payload of a received cell is stored into an unused bank. A chain of the bank addresses each storing the payload of the received ATM cell is formed for each virtual channel of received ATM cells. According to a bank address read out from the chain corresponding to each channel of the TDM highway, the data as the TDM data is read out from the buffer memory.

12 Claims, 13 Drawing Sheets

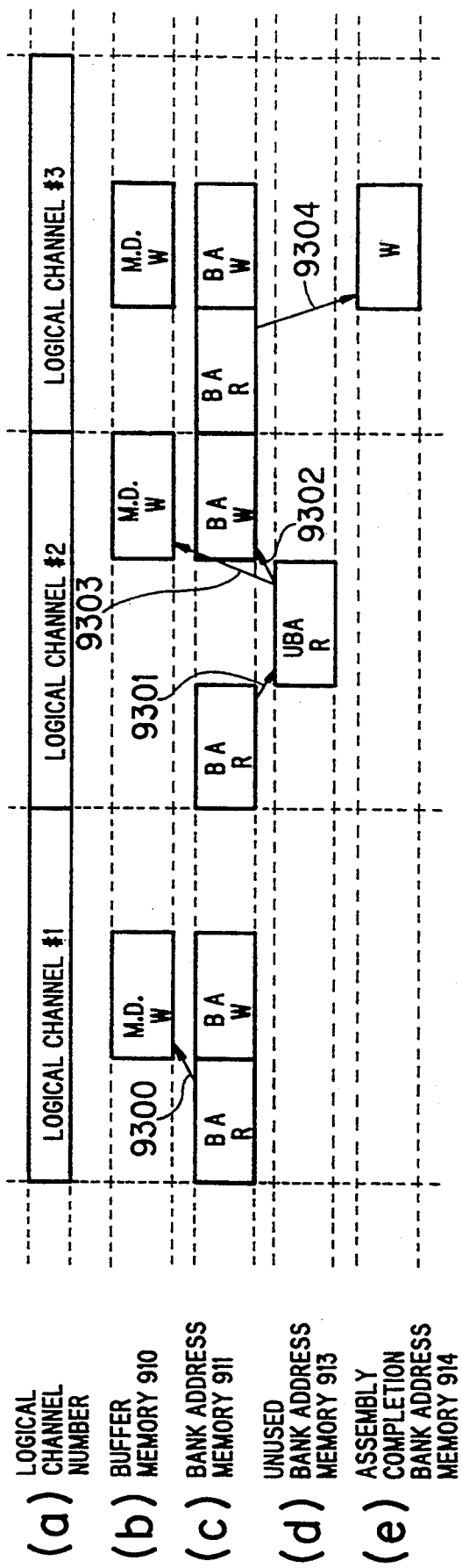

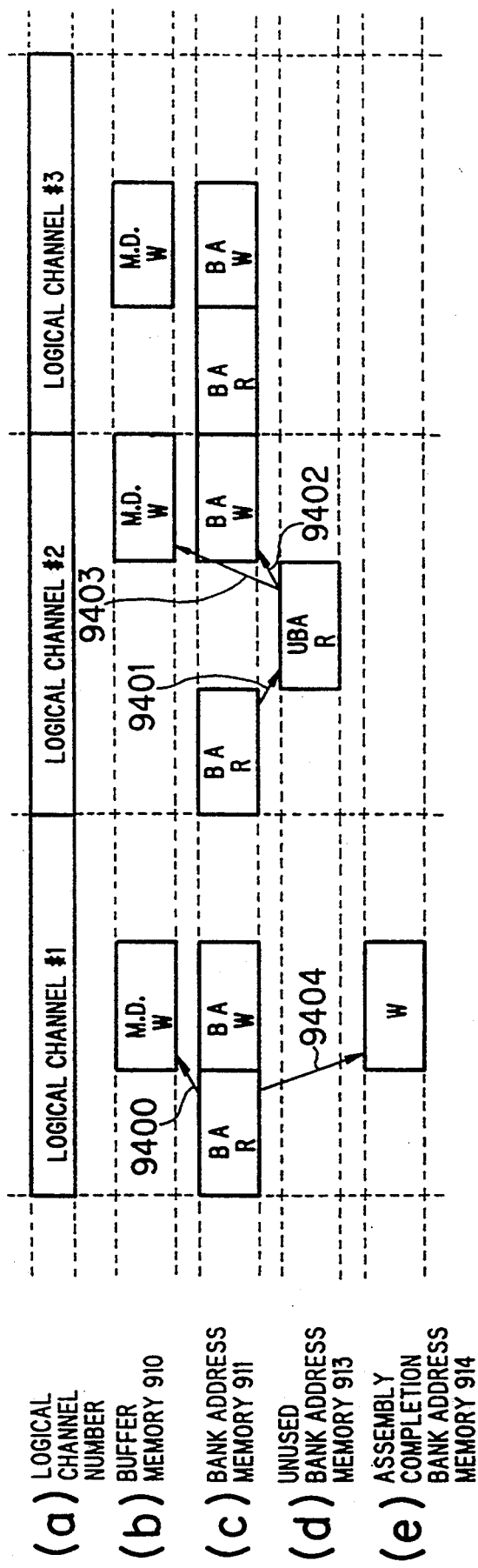

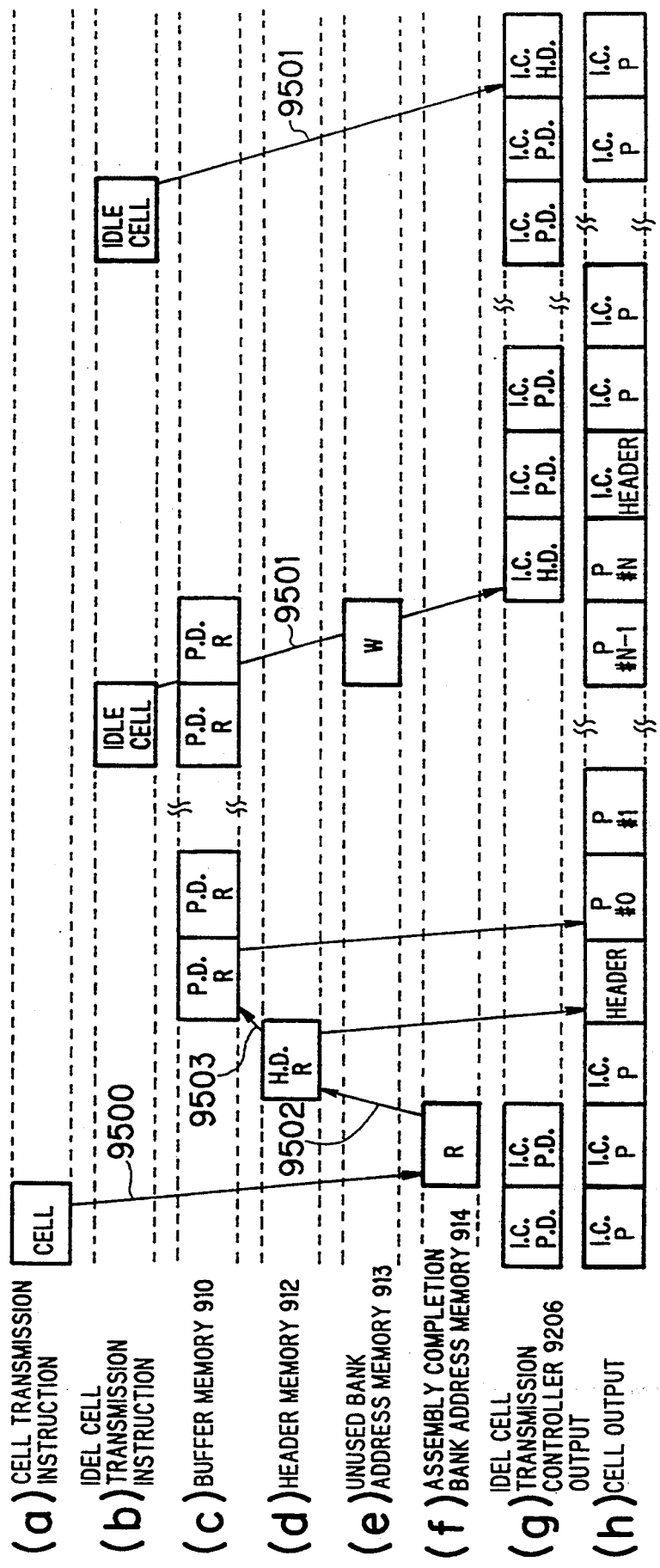

MULTIPROCESSING SYSTEM FOR ASSEMBLY/DISASSEMBLY OF ASYNCHRONOUS TRANSFER MODE CELLS

FIELD OF THE INVENTION

The present invention relates to assembly/disassembly of ATM (Asynchronous Transfer Mode) cells and, in particular, to a multiprocessing system for assembling/disassembling ATM cells in order to connect an ATM network system to a network system of an other information transfer mode.

BACKGROUND OF THE INVENTION

The B-ISDN (Broad band-Integrated Service Digital Network) is a network capable of dealing with the transfer of various types of information contemplated in the future, such as full motion pictures, high-definite images or large capacity files, it has been vigorously researched and developed worldwide. For such a B-ISDN, ATM is currently recognized to be more suitable than the conventional STM (Synchronous Transfer Mode).

ATM is an information transfer mode where information to be transmitted is loaded into fixed length cells, each cell comprising a header and an information field which are multiplexed together for transfer over transmission lines. These fixed length cells are hereinafter referred to as ATM cells. ATM allows the network system to obtain an effective use of the transmission lines, as well as a flexibility such that information transfer can be made regardless of information type (sound and image).

In order to achieve integrated service by the ATM network, however, it is necessary to connect the ATM network to the existing communication network and, to such an end, a system for cell assembly/disassembly becomes indispensable. Since cell assembly/disassembly is made for each call, a high speed and large multiplexing capability is necessary to the system for cell assembly/disassembly.

A conventional system is hereinafter described, taking the cell assembly/disassembly, by way of example, which is performed between fixed bit rate data on an N-channel time division multiplex (TDM) data highway and ATM cells on the ATM highway.

It should be noted that the term "virtual channel" or "VC" is hereinafter defined by VPI (Virtual Path Identifier) and VCI (Virtual Channel Identifier).

First, a cell assembly apparatus, which assembles ATM cells from the TDM data, is provided with N buffer memories and N memory controllers corresponding to the N channels, respectively. Upon receipt of the TDM data, it is allocated to the respective buffer memories according to their channels where the respective cells are individually assembled. On completion of the assembly of a cell, the cell is read out from the buffer memory and is transmitted to the ATM highway as an ATM cell.

A cell disassembly apparatus, which disassembles ATM cells into the TDM data, is provided with N FIFO (First-In First-Out) buffer memories and N memory controllers corresponding to the N virtual channels, respectively. The received ATM cells are stored into the respective buffer memories in the received order. Subsequently, a virtual channel is specified based on frame and clock pulses of the TDM data highway, and the data of an ATM cell is read out from the buffer memory corresponding to the specified virtual channel to be emitted to the data highway as the TDM data.

However, in the conventional cell assembly/disassembly, it has been necessary to prepare respective buffer memories having capacities matching with the data speeds on the TDM data highway. As a result, if one intends to deal with a plurality of fixed bit rate data each differing in speed, it has been necessary to provide all the buffer memories with the capacity corresponding to the maximum data speed, or specify the channel to be used for each bit rate. Further, in assembly of an ATM cell, since on completion of assembly the cell is read out from the buffer memory, there are some cases where several cells are read out simultaneously. Therefore, it has been necessary to prepare at least one extra buffer memory for standby purpose.

In a cell assembly, assuming that the TDM data highway, as input, is comprised of 127 channels for 64 Kbit/s fixed bit rate data and one channel for 52 Mbit/s fixed bit rate data, and that the ATM highway as output is comprised of 128 channels, transmission a rate of 156 Mbit/s, and a cell length of 424 bits ($=53$ bytes$\times 8$ bits), the time required to emit the ATM cell will amount to about 347.9 $\mu$sec ($=128\times 424$ bit/156 Mbit/s). The data amount flowing in from the data highway within this period of time will result in about 22.3 bits ($=347.9$ $\mu$sec$\times 64$ Kbit/s) for 64 Kbit/s and 18090.8 bits ($=47.9$ $\mu$sec$\times 52$ Mbit/s) for 52 Mbit/s.

If the respective capacities of all buffer memories are set to the capacity corresponding to the maximum fixed bit rate, then the whole capacity of the buffer memories for cell assembly becomes about 54.3 Kbit ($=128\times 424$ bits) and the capacity of the standby buffer memory becomes about 2.3 Mbits ($=128\times 18090.8$ bits) and, hence, the necessary amount of memory is about 2.4 Mbit.

On the other hand, according to the arrangement in which the channel is used restrictively for each bit rate, the whole capacity of the cell assembly buffer memories becomes about 54.3 Kbit ($=128 \times 424$ bit) and the capacity of the standby buffer memory becomes about 20.9 Kbit ($=127\times 22.3$ bits$+18090.8$ bits). Hence, the necessary amount of memory can be reduced to about 75.2 Kbit. However, the arrangement of the fixed bit rates on the TDM data highway cannot be changed. For instance, if the TDM data highway as an input is comprised of 8 channels including the fixed bit rate data of 1.5 Mbits/s, then the time required to stand by will amount to about 21.7 $\mu$sec ($=8\times 424$ bits/156 Mbit/s). Data flowing in within this period of time equals about 32.6 bits ($=21.7$ $\mu$sec$\times 1.5$ Mbit/s). Therefore, the standby buffer memory of 64 Kbit/s cannot be used and the fixed bit rates cannot be changed.

In cell disassembly, assuming that the additional delay is set to 6 msec and the TDM data highway as output is comprised of 32 channels for 64 Kbit/s of fixed bit rate data and 2 channels for 1.5 Mbit/s of fixed bit rate data. In this case, the memory capacity required for one channel of 64 Kbit/s equals 384 bits ($=64$ Kbit/s $\times 6$ msec) and the memory capacity required for one channel of 1.5 Mbit/s equals 9216 bits ($=1.5$ Mbit/s$\times 6$ msec). Therefore, if any arbitrary time slot of the TDM can be used, the memory amount required will entirely equal 313 Kbits ($=(32+2)\times 9216$ bits).

On the other hand, if the virtual channel used for each fixed bit rate is specified, then the necessary amount of memory will equal 32 Kbits ($=32\times 384$ bits$+2\times 9216$ bits), which means that the required amount of memory can be reduced as in the cell assembly. However, this arrangement cannot deal with, for example, 3 channels of 1.5 Mbit/s although this TDM data requires a smaller amount of memory, 28 Kbits, and are lower in entire bit rate. Each buffer memory is used restrictively for the corresponding virtual channel.

It is an object of the present invention to provide a cell assembly/disassembly system where the necessary amount of buffer memory can be reduced and the arrangement of bit rates on the TDM data highway can be arbitrary decided.

SUMMARY OF THE INVENTION

A multiprocessing system according to the present invention is comprised of a cell assembly and a cell disassembly, each having one buffer memory with its memory area logically divided into a plurality of data areas (hereinafter referred to as banks).

The cell disassembly system which disassembles ATM cells into multiplex data on a multiplex transmission line having a plurality of channels is provided with the buffer memory logically divided into a plurality of banks each being capable of storing the payload data of an ATM cell. An accumulation control unit specifies one unused bank of said buffer memory to store the payload data of an received ATM cell. A collection of the addresses of the banks each storing the payload data of the received ATM cell is stored for each virtual channel of received ATM cells. Preferably, the collection of bank addresses is comprised of a time series chain of bank addresses for each virtual channel of received ATM cells. According to a bank address read out from the collection for the virtual channel corresponding to each channel of the multiplex transmission line, a disassembly control unit reads out data as the multiplex data from said buffer memory.

Preferably, the accumulation control unit is comprised of an unused bank address memory for retaining the addresses of the banks which are not used for cell disassembly.

More preferably, the unused bank address memory retains the unused bank addresses in a queue. The unused bank address is read out from the top of said queue, and the unused bank address where the payload data has been read out by the disassembly control unit is written onto the bottom of said queue in the unused bank address memory.

The cell assembly system which assembles ATM cells from multiplex data on a multiplex transmission line having a plurality of channels is provided with the buffer memory logically divided into a plurality of banks each being capable of storing the multiplex data on the multiplex transmission line. An assembly control unit specifies the respective bank addresses of a collection of banks in the buffer memory corresponding to the virtual channels of ATM cells to store the multiplex data received from the multiplex transmission line, and further specifies an unused bank address when one of said specified banks stores the multiplex data in the payload length of an ATM cell to store the multiplex data. A transmission control unit forms an ATM cell by using the data read out from the bank where the multiplex data is stored in the payload length of an ATM cell, and transmits the ATM cell to the ATM highway.

Preferably, the assembly control unit is comprised of an unused bank address memory for retaining the addresses of the banks which are not used for cell assembly, and an assembly completion bank address memory for retaining the addresses of the banks each storing the multiplex data in the payload length of an ATM cell.

The unused bank address memory preferably retains the unused bank addresses in a queue. The unused bank address is read out from the top of said queue in said unused bank address memory. The bank address from which the data is read out by the transmission control unit is written onto the bottom of the queue in the unused bank address memory.

The assembly completion bank address memory preferably retains the bank addresses in a queue. The bank address storing the multiplex data in the payload length of an ATM cell is written onto the bottom of the queue. The bank address is read out from the top of the queue to be transmitted.

BRIEF DESCRIPTION OF THE DRAWINGS

FIG. 11 is a time chart for explaining operations of the cell assembly control unit in the present embodiment;

FIG. 12 is a time chart for explaining other operations of the cell assembly control unit; and FIG. 13 is a time chart for explaining operations of the cell transmission control unit in the present embodiment.

DETAILED DESCRIPTION OF THE PREFERRED EMBODIMENTS

A specific embodiment of the present invention is hereinafter described with reference to the accompanying drawings. An assembly/disassembly system according to the present invention is comprised of a cell assembly and a cell disassembly, each having one buffer memory with its memory area logically divided into a plurality of data areas. The cell assembly receives fixed bit rate data from a TDM data highway, assembles ATM cells from the fixed bit rate data by using the buffer memory, and transmits the ATM cells to an ATM highway. The cell disassembly receives ATM cells from the ATM highway, disassembles the ATM cells into fixed bit rate data by using the buffer memory, and transmits the fixed bit rate data to the TDM data highway. Each of them is hereinafter described in detail.

DISASSEMBLY OF ATM CELLS

Figure 1:
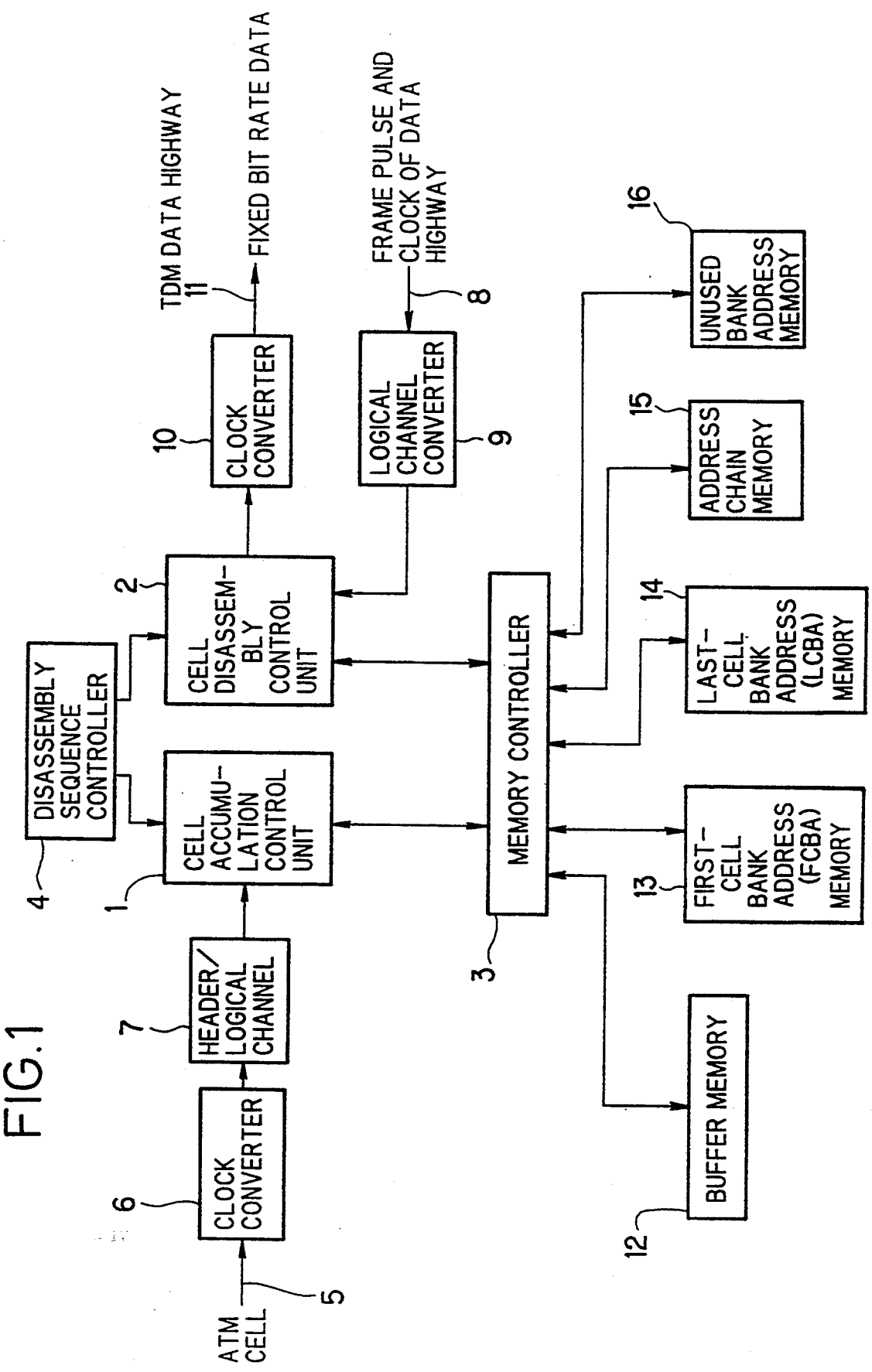
FIG. 1 is a schematic block diagram of the cell disassembly apparatus according to one embodiment of the present invention.

Referring to FIG. 1, the cell disassembly is substantially comprised of a cell accumulation control unit 1, a cell disassembly control unit 2, a memory controller 3, a disassembly sequence controller 4, a buffer memory 12, and other necessary address memories 13 through 16.

The buffer memory 12 is logically divided into a plurality of data areas each having a certain amount of memory (hereinafter referred to as bank). The payload data of each ATM cell received from the ATM highway 5 is stored into the corresponding bank of the buffer memory 12 according to its specified channel.

The memory 13 is a first-cell bank address (FCBA) memory which retains the address of the bank storing the payload data of the ATM cell which is reached earliest among the ATM cells stored within the buffer memory 12. Such earliest cell is hereinafter referred to as the first cell.

The memory 14 is a last-cell bank address (LCBA) memory which retains the address of the bank storing the payload data of the ATM cell which reaches latest among the ATM cells stored within the buffer memory 12. Such a latest cell is hereinafter referred to as the last cell.

The memory 15 is a bank address chain memory which retains the time series chain of bank addresses or the arrival time relationship from the second cell which reaches subsequent to the first cell up to the last cell.

The memory 16 is an unused bank address memory which retains the addresses of the unused banks which are waiting to store cells in a queue.

The buffer memory 12 and the memories 13 through 16 are controlled for read/write via the memory controller 3 by the cell accumulation unit 1 and the cell disassembly control unit 2, as will be described in detail later.

ATM cells received from the ATM highway 5 are transferred from the clock of the ATM highway 5 to the internal clock of this apparatus by clock converter 6. Further, the header of the ATM cell which has been transferred to the internal clock is converted to the logical channel used in this apparatus by the header/logical channel converter 7. And the logical channel is input to the cell accumulation control unit 1 together with the payload data of the relevant ATM cell.

The cell accumulation control unit 1 controls the buffer memory 12 and the memories 13 through 16 such that the payload data of a received ATM cell is stored into the unused bank of the buffer memory 12 and the address of the stored bank and its order of arrival are retained in the memories. 13 through 15 for each virtual channel. The cell disassembly control unit 2 controls the buffer memory 12 and the memories 13 through 16 such that data is read out from the bank storing the payload data in units of the TDM fixed bit rate data for each virtual channel specified on the basis of the frame pulse and clock of the TDM data highway 11, and is transmitted through the clock converter 10 to the TDM data highway 11.

The disassembly sequence controller 4 controls the cell accumulation control unit 1 and the cell disassembly control unit 2 to resolve read/write contention for the buffer memory 12 and other memories 13 through 16.

Figure 2:
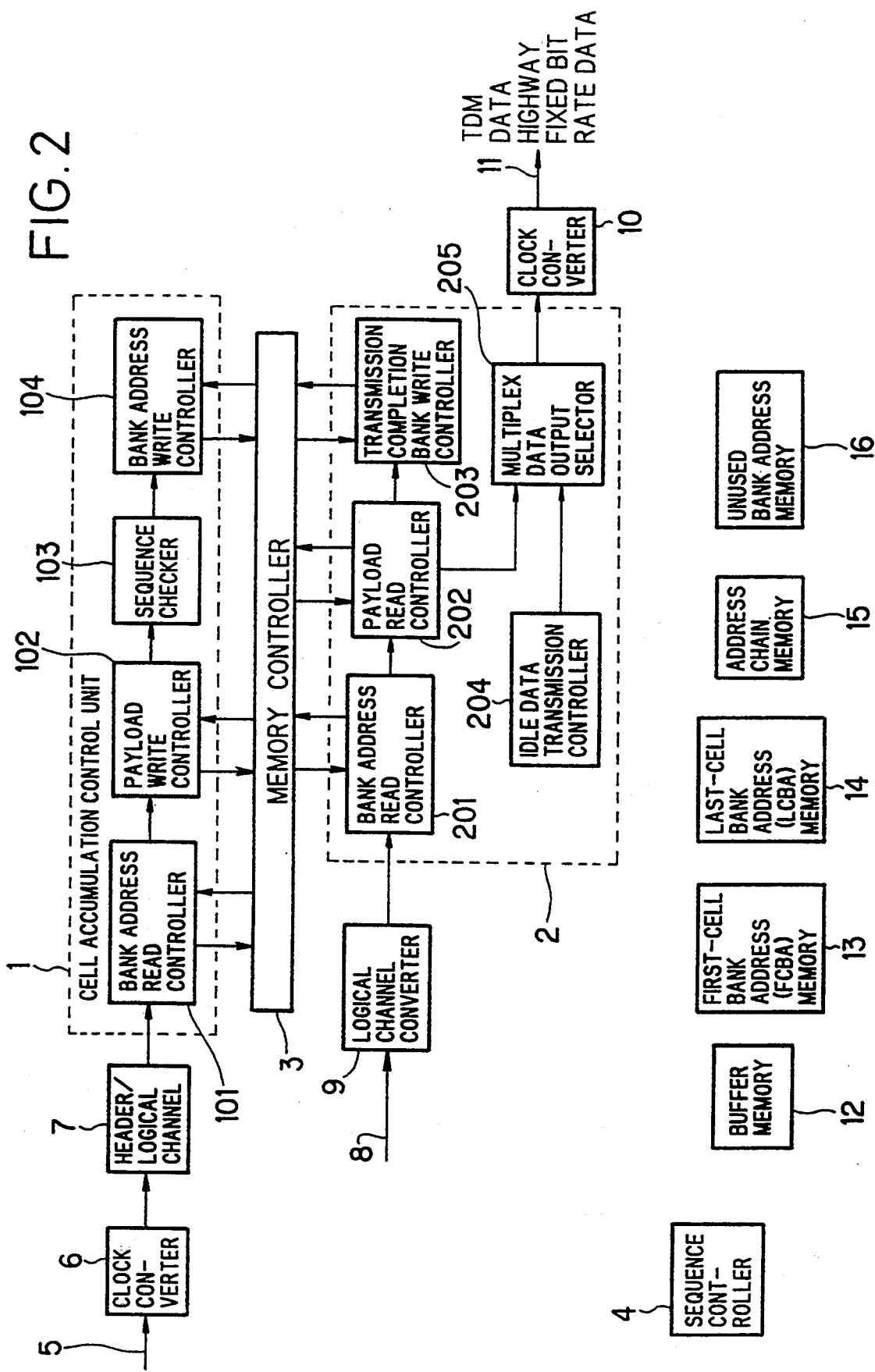
FIG. 2 is a detailed block diagram of the cell disassembly apparatus shown in FIG. 1.

Referring to FIG. 2, the cell accumulation control unit 1 is provided with a bank address read controller 101, a payload write controller 102, a sequence number checker 103 and a bank address write controller 104. On receipt of the payload and the logic channel from the header/logical channel converter 7, the cell accumulation controller 1 writes the payload data of the cell on the unused bank of the buffer memory 12 in bank units every time an ATM cell is received, and makes a time series chain structure of the bank addresses on the FCBA memory 13, the LCBA memory 14, and the address chain memory 15 for each logical channel.

The cell disassembly control unit 2 is provided with a bank address read controller 201 which receives the logical channel from the logical channel converter 9, a payload read controller 202 which receives the bank address from the bank address read controller 201, a bank address write controller 203 which receives the read completion signal from the payload read controller 202, an idle data transmission controller 204 and a multiplex data output selector 205 which receives the payload data from the payload read controller 202 and the idle data from the idle data transmission controller 204. The cell disassembly control unit 2 disassembles the payload data of the first cell of the chain structure for the logical channel specified by the logical channel converter 9 into TDM data. The TDM data is transferred from the internal clock to the clock of TDM data highway 11 by the clock converter 10, and is transmitted to the TDM data highway 11. If there is no cell to be disassembled, then the idle data is output from the idle data transmission controller 204.

CELL ACCUMULATION

Figure 3:
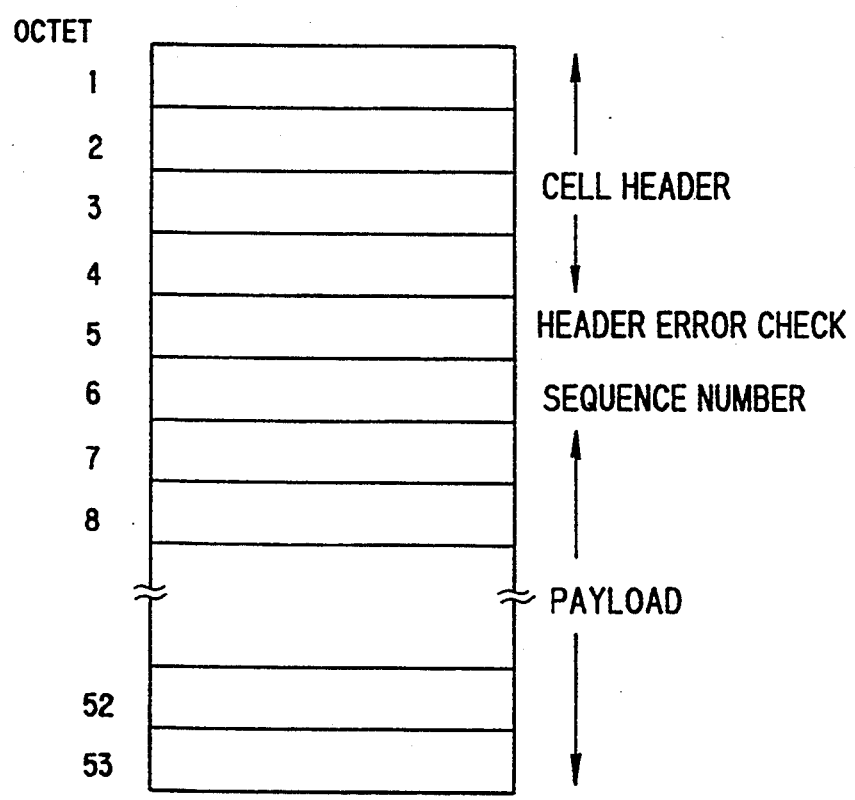
FIG. 3 is a schematic illustration showing the format of an ATM cell.

First, referring to FIG. 3, octets 1 through 4 of an ATM cell are the header, which is converted to the logical channel by the header/logical channel converter 7. Octet 5 is used for error check. Octet 6 is the sequence number which is used for sequence control. Octets 7 through 53 are the data called payload, which part is transmitted to the TDM data highway 11 as the fixed bit rate data.

Figure 4:
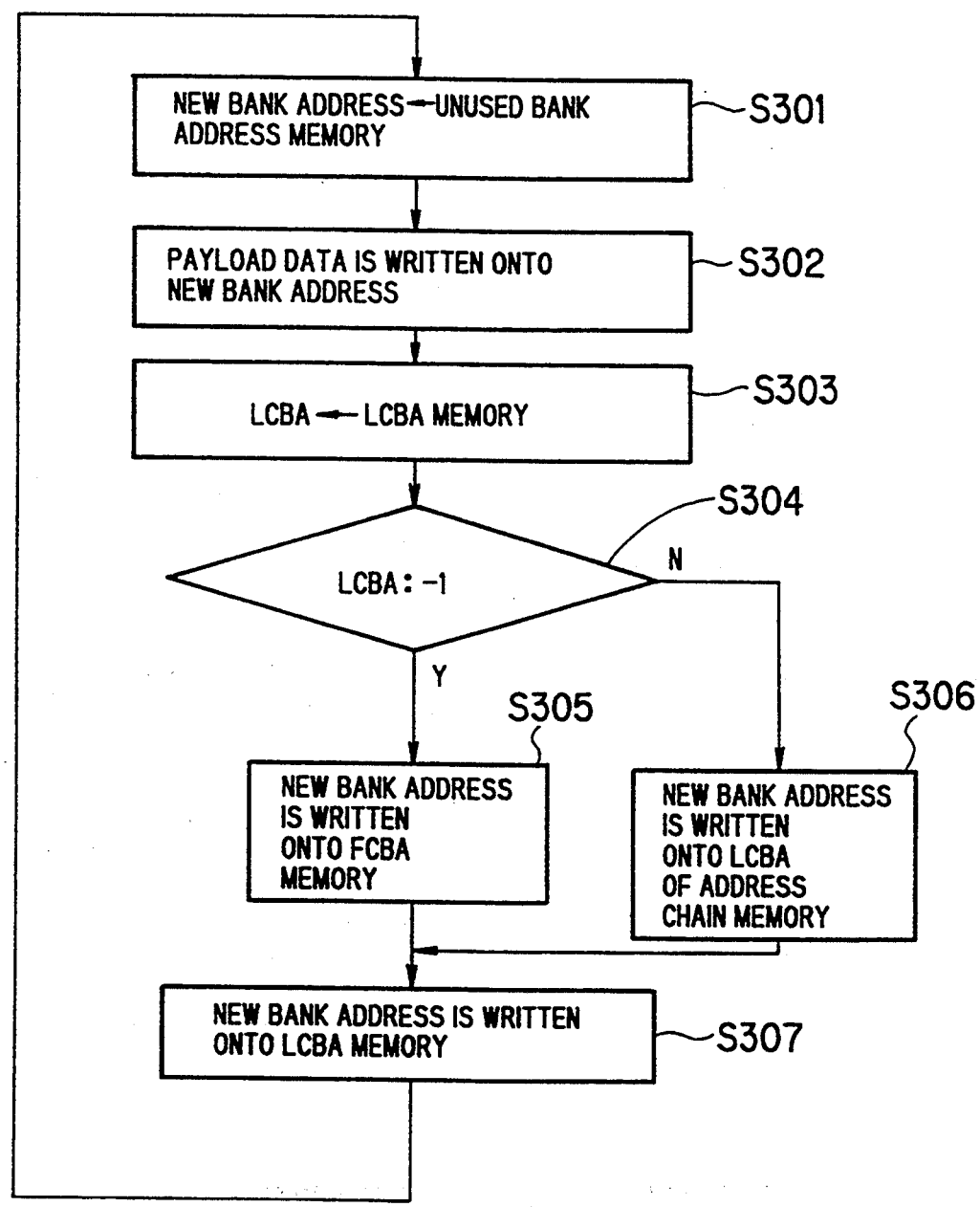
FIG. 4 is a flow chart for explaining the cell accumulation process.

FIG. 4 is a flow chart for explaining the process flow of the cell accumulation control unit 1. On receipt of the logic channel and the payload data from the header/logical channel converter 7, the bank address read controller 101 reads out an unused bank address as a new bank address from the unused bank address memory 16 (see S301 of FIG. 4). The payload data is stored in the bank of the buffer memory 12 indicated by the new bank address (S302).

Next, the last cell bank address (LCBA) is read out from the LCBA memory 14 (S303). Then, the chain structure formed on the memories 13 through 15 is updated (S304–S307). If the content of LCBA is −1 (Y of S304), which means that the relevant cell is first received in that logical channel, therefore, the new bank address is written onto the FCBA memory 13 and the LCBA memory 14 (S305 and S307). This process is performed every time an ATM cell arrives, but not when the idle cell arrives. On the other hand, If the content of LCBA is not −1 (N of S304), which means that the address chain exists in that logical channel, therefore, the new bank address is written onto the LCBA of the address chain memory 15 and the LCBA memory 14 (S306 and S307).

ADDRESS CHAIN STRUCTURE

Figure 5:
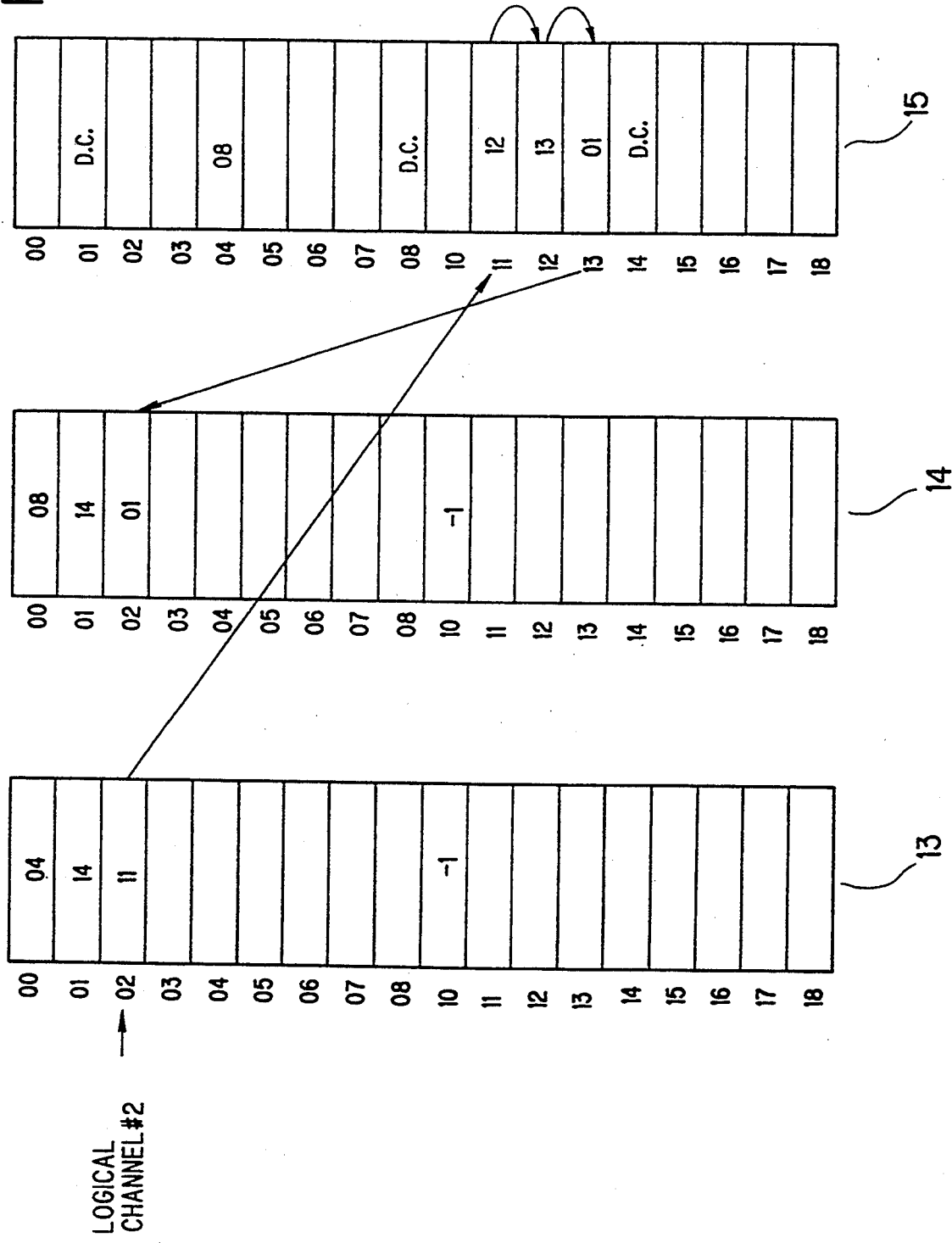
FIG. 5 is a schematic illustration of the bank address memories 13 and 14 and the address chain memory 15 for explaining a specific example of an address chain structure.

FIG. 5 shows an example of the chain structure of bank addresses which is built in the memories 13 through 15. In this example, let us assume that the number of virtual channels (VCs) is 4, the first virtual channel VC1 corresponds to the logical channel #2 where 4 cells are accumulated, VC2 the logical channel #1 accumulating 1 cell, VC3 the logical channel #0 accumulating 2 cells, and VC4 the logical channel #10 accumulating no cell.

Since VC1 corresponds to the logical channel #2, referring to the address [02] of the FCBA memory 13, the data [11] stored in the address [02] can be obtained as the bank address of the first cell. Further, using this data [11] as an address for access of the address chain memory 15, the data [12] is obtained which means that the subsequent cell is stored in the bank address [12]. Likewise, the address [12] leads to the data [13], and further the address [13] leads to the data [01]. However, the data [01] is the same as the data stored in the address [02] of the LCBA memory 14. Therefore, the data [01] means the last cell bank address in the logical channel #2.

Similarly, in the VC2 corresponding to the logical channel #1, when the address [01] of the FCBA memory 13 is referenced, the data [14] is obtained. Since the data of the memory 14 is also [14], the first cell and the last cell are the same. In the VC3 corresponding to the logical channel #0, if the address [00] of the FCBA memory 13 is referenced, the data [04] is obtained. Since the data of the address [04] of the address chain memory 15 is [08], the second cell and the last cell are the same because the data of the LCBA memory 14 is [08]. Further, it is found that no bank is used in VC4 because the FCBA memory 13 and the LCBA memory 14 are both [−1] in data.

Figure 6:
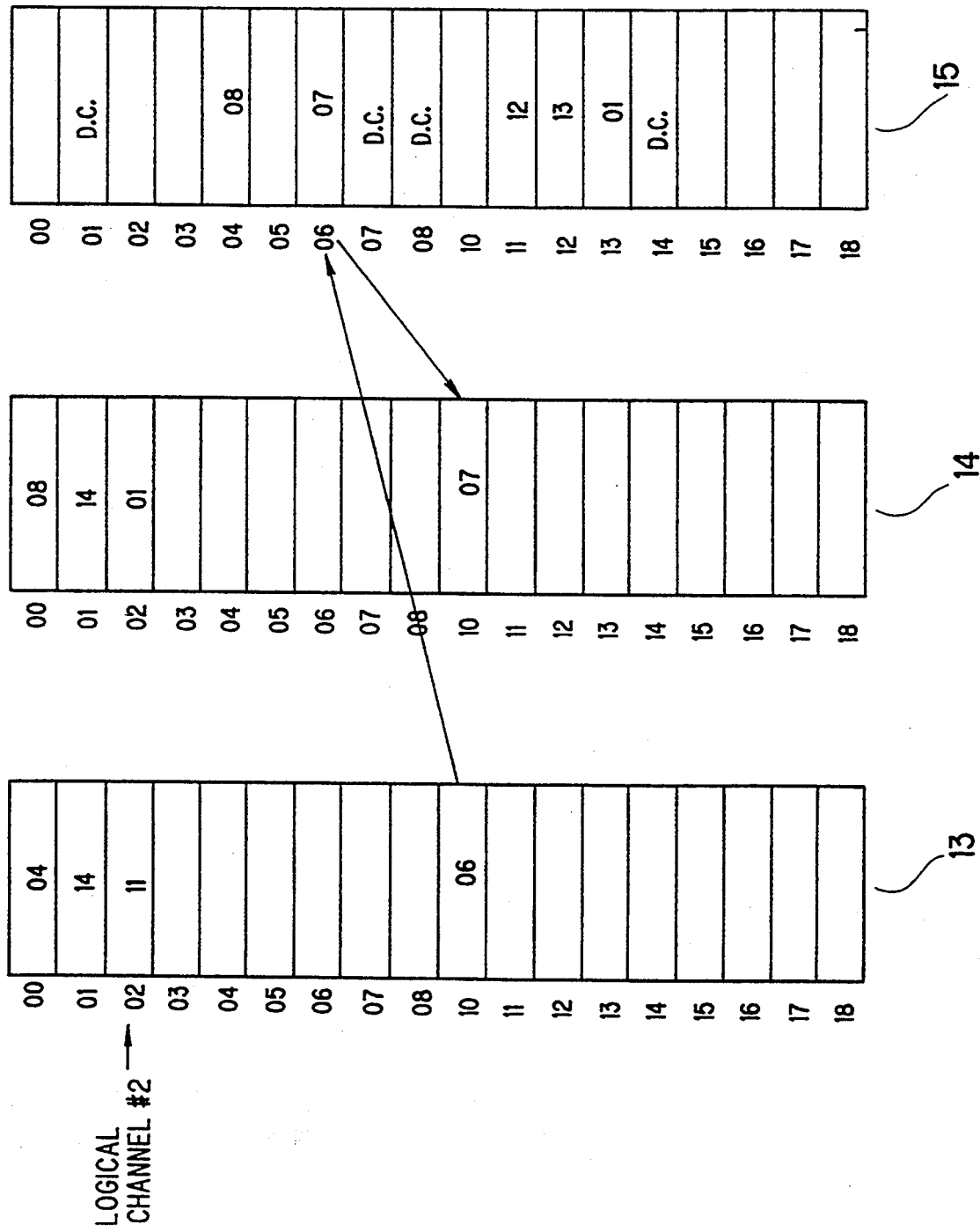
FIG. 6 is a schematic illustration of the bank address memories and 14 and the address chain memory 15 for explaining the address chain structure.

The operation when the cell of VC4 arrives is described with reference to FIG. 6 showing an example of the chain arrangement. When a cell arrives, an unused bank address is read out from the unused BA memory 16. Here, let us assume that the bank address is [06]. According to this bank address, the payload data is written onto the corresponding bank of the buffer memory 13 (see S302 of FIG. 4).

Next, the LCBA memory 14 is updated. Since the cell is the first because the data is [−1], the data is also written onto the FCBA memory 13 (see S305 and S307 on FIG. 4). That is, for both the memories 13 and 14, the data of their address [01] becomes [06]. Further, if the subsequent cell of VC4 arrives, assuming that the address of the unused bank is [07], then the data of the LCBA memory 14 becomes [07], and the data stored in the address [06] of the address chain memory 15 also becomes [07] (see S304, S306, and S307 of FIG. 4). The FCBA memory 13 is not changed.

CELL DISASSEMBLY

The disassembly operation of the cell disassembly control unit 2 is described with reference to FIGS. 7 and 8. As illustrated in FIG. 8, the time slot TS0 is allocated to a frame pulse, and one frame is comprised of N time slots. Since a logical channel is allocated to each time slot, the frame pulses and the clock shown in FIG. 8 can be converted to the logical channels by the logical channel converter 9.

Figure 7:
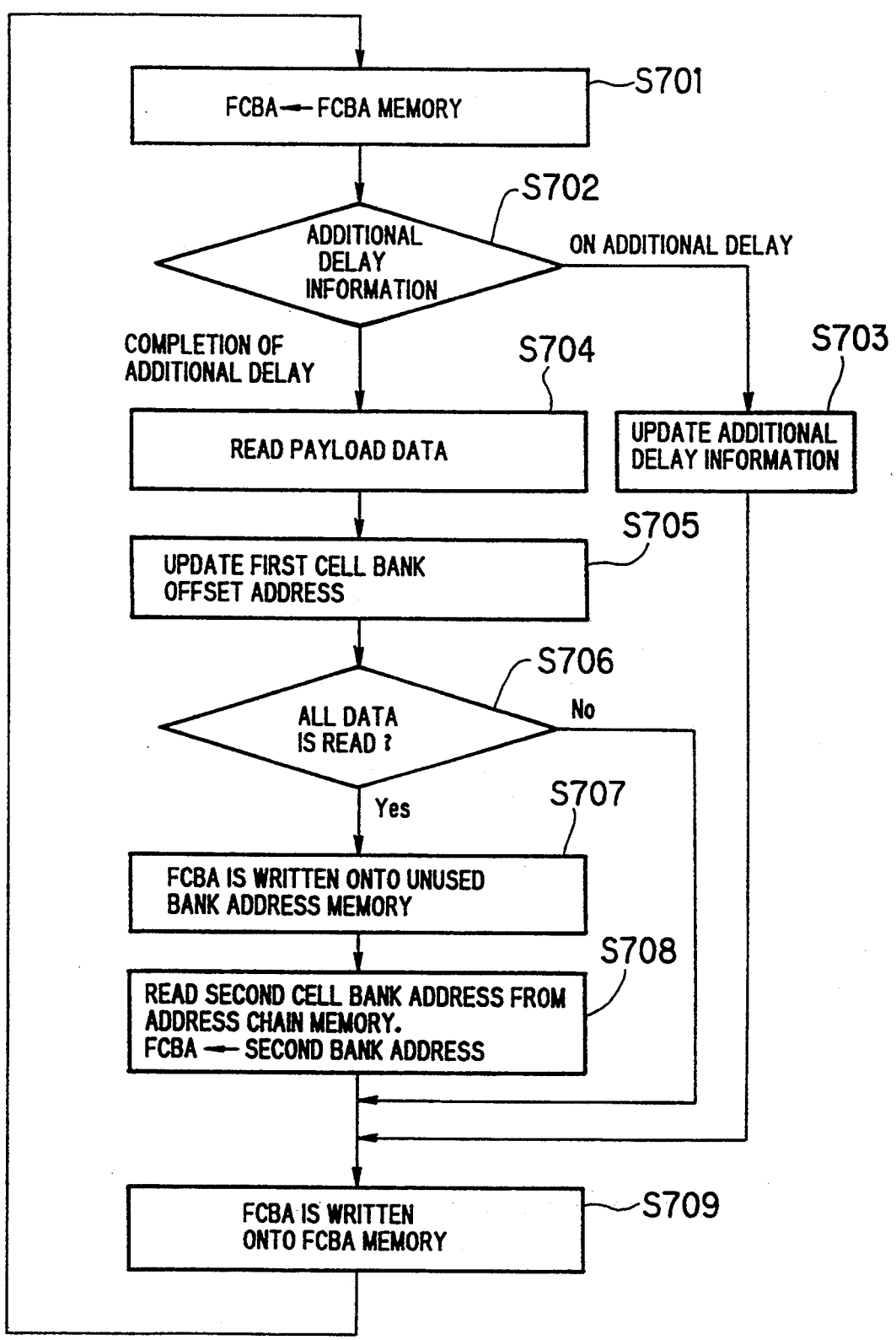
FIG. 7 is a flow chart for explaining the cell disassembly process.
Figure 8:
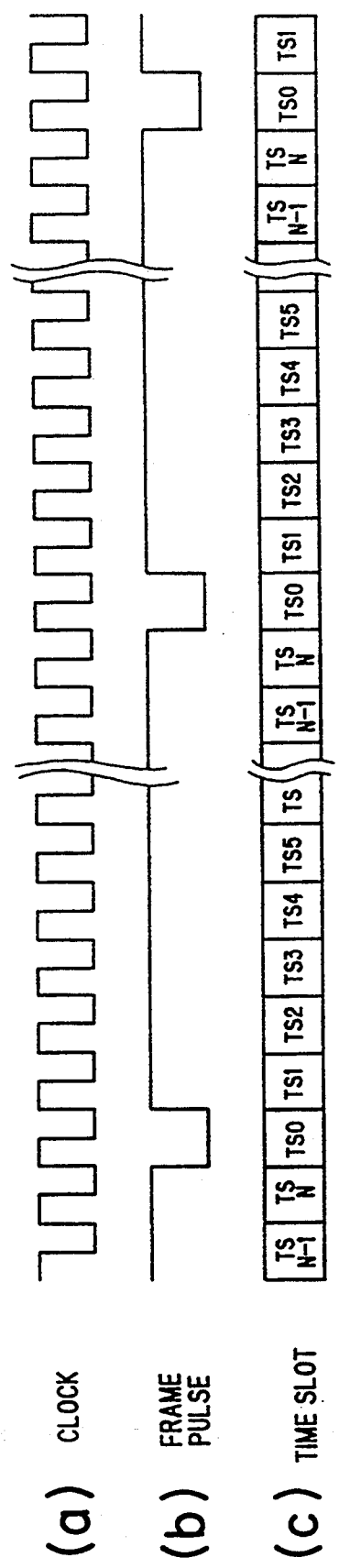
FIG. 8 is a schematic time chart for explaining the format of a time division multiplex data highway.

Referring to FIG. 7, when the logical channel is obtained from the time slots, a first cell bank address (FCBA) is read out from the FCBA memory 13 by using the logical channel as an address (S701 of FIG. 7).

Subsequently, using the additional delay information, the decision is made whether an additional delay comes to an end or not (S702). The additional delay is added to the cell disassembly operation in order to cancel fluctuations in intervals of cell arrival time. If the additional delay is going on, then the idle data is emitted to the TDM data highway, the additional delay information is updated (S703), and the FCBA is written onto the FCBA memory 13 (S709).

On the other hand, if the additional delay is completed, the payload data is read from the buffer memory 12 to the payload read controller 202 according to the bank address and the bank offset address indicating the location of data within the bank (S704). The data read to the payload read controller 202 is transmitted to the TDM data highway 11 via the TDM output selector 205. After that, the bank offset address is updated (S705), and decision is made whether the payload data is left within the bank or not (S706). If it is left (No of S706), the bank address is written onto the FCBA memory 13. If not (Yes of S706), that bank address is written onto the unused BA memory 16 for accumulating unused banks (S707). Subsequently, the bank address of the second cell is read as a first cell bank address from the address chain memory 15 (S708) and is written onto the FCBA memory 15 (S709).

As described above, the necessary memory can be minimized by using the buffer memory dynamically to disassemble the cell into the fixed bit rate data on the TDM data highway. At the same time, the position of the time slot allocated to the TDM data highway can be arbitrarily set.

ASSEMBLY OF ATM CELL

Figure 9:
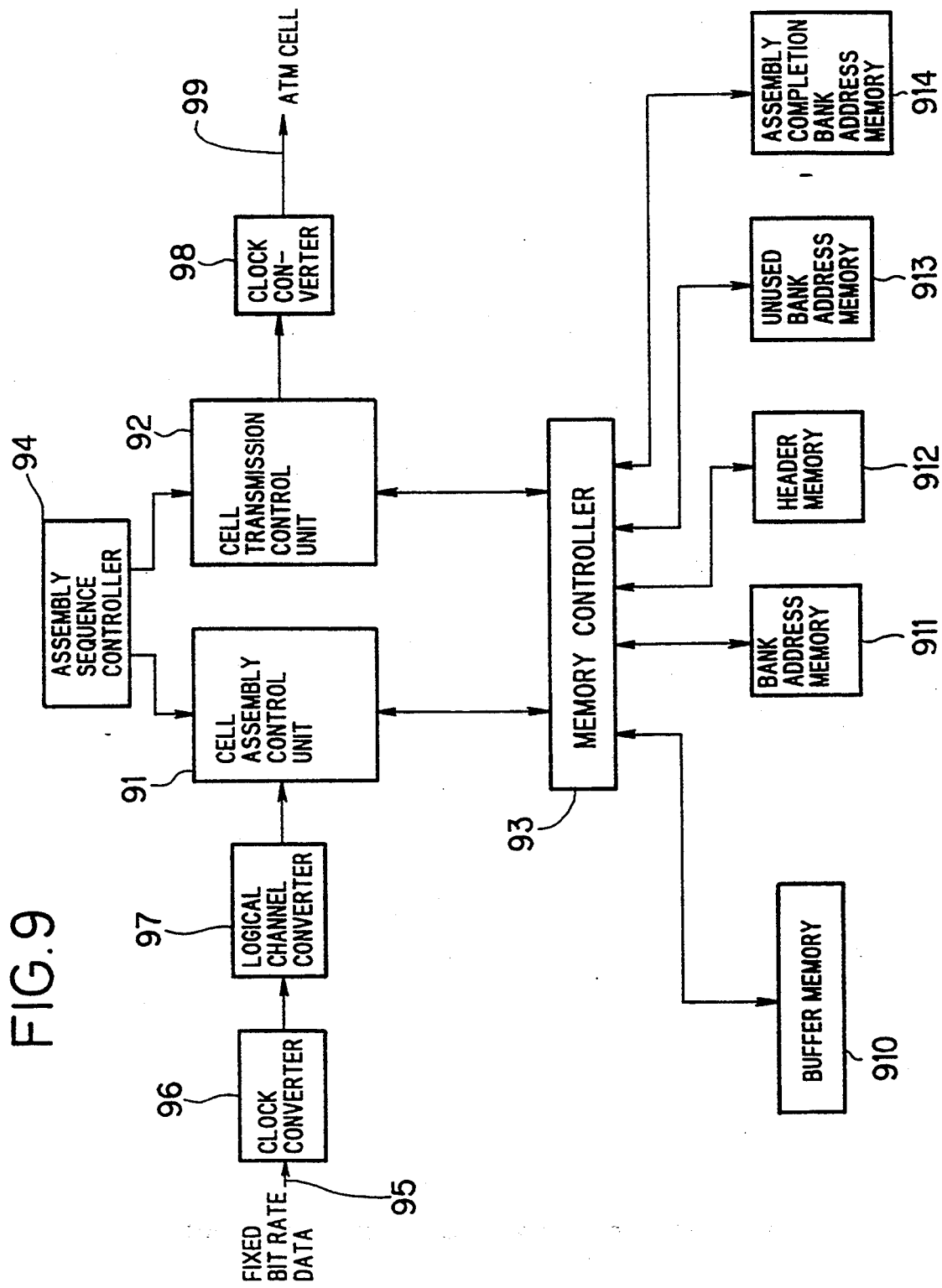
FIG. 9 is a schematic block diagram of the cell assembly apparatus according to one embodiment of the present invention.

As illustrated in FIG. 9, the cell assembly is mainly comprised of a cell assembly control unit 91, a cell transmission control unit 92, a memory controller 93, an assembly sequence controller 94, a buffer memory 910, and other necessary memories 911 through 914.

The buffer memory 910 is logically divided into a plurality of banks. The fixed bit rate data received from the TDM data highway 95 is stored into the respective banks according to specified virtual channel.

The bank address memory 911 stores the bank addresses of the buffer memory 910 and their valid flags each indicating whether a bank is allocated to a logical channel or not. Receiving the logical channel specified by the high order control system, the bank address memory 911 outputs the address and valid flag of the relevant bank by using the logical channel as an address. The header memory 912 stores the headers of the ATM cells and outputs the cell header corresponding to the logical channel specified by the high order control system.

The unused bank address memory 913 stores the addresses of the banks which are not used for cell assembly in a queue. The assembly completion bank address memory 914 stores the addresses and logical channels of the banks where the cell assembly is completed in a queue.

The frame pulse and clock of the N-channel multiplex data from the TDM data highway 95 is converted to the internal clock of this apparatus by the clock converter 96. Further, the logical channel converter 97 converts the N channels of the multiplex data into the logical channels within this apparatus based on the frame pulse and clock on the TDM data highway 95, and outputs the received multiplex data and its logical channel number to the cell assembly control unit 91.

The cell assembly control unit 91, as will be described later, controls the buffer memory 910 and the memories 911 through 914 such that the received TDM data is stored into the respective banks of the buffer memory 910 for each virtual channel to assemble ATM cells under the address control using the control memories 911 through 914. The cell transmission control unit 92 controls the buffer memory 910 and the memories 911 through 914 such that the data of the bank where the cell assembly is completed is read out from the buffer memory 910 to emit a cell to which a header is attached. That cell is converted to the ATM clock by the clock converter 98 to be sent out to the ATM highway 99 as an ATM cell.

Figure 10:
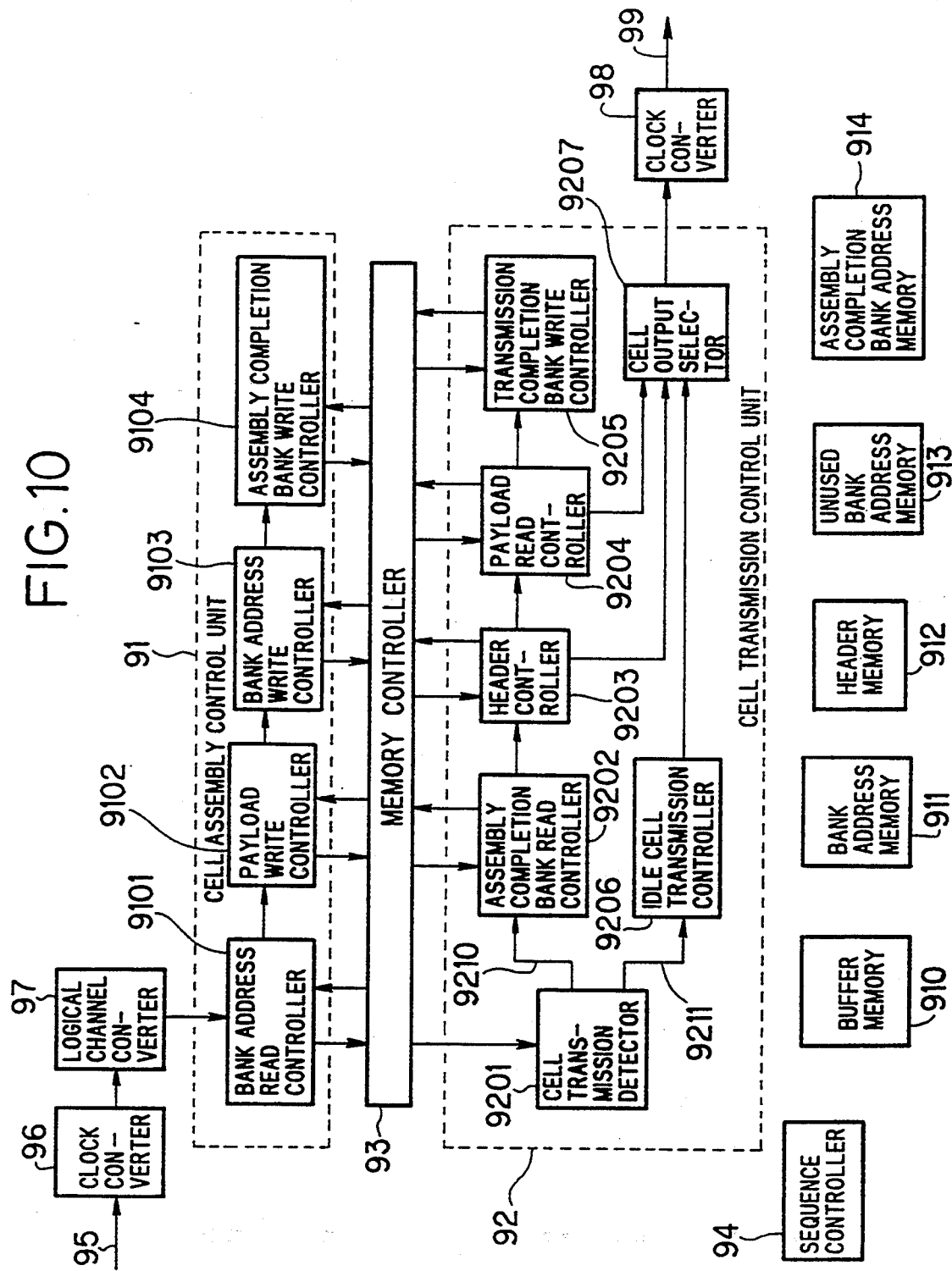
FIG. 10 is a detailed block diagram of the cell assembly apparatus shown in FIG. 9.

The assembly sequence controller 94 controls the cell assembly control unit 91 and the cell transmission control unit 92 to resolve read/write contention for the buffer memory 910 and other memories 911 through 914. With reference to FIG. 10, the cell assembly control unit 91 and the cell transmission control unit 92 are described in further detail.

Referring to FIG. 10, the cell assembly control unit 91 is comprised of a bank address read controller 9101, a payload write controller 9102, a bank address write controller 9103, and an assembly completion bank write controller 9104. The cell transmission control unit 2 is comprised of a cell transmission detector 9201 for detecting cell transmission timing, an assembly completion bank read controller 9202, a header controller 9203, a payload read controller 9204, a transmission completion bank write controller 9205, an idle cell transmission controller 9206, and a cell output selector 9207 for selecting either the output of the header controller 203 and the payload read controller 204 or the output of the idle cell transmission controller 9206.

CELL ASSEMBLY CONTROL UNIT 91

The bank address read controller 9101 receives the multiplex data and the logical channel number from the logical channel converter 97 and, subsequently, reads out the bank address uniquely determined by the entered logical channel number and its valid flag from the bank address memory 911. If this valid flag indicates that the corresponding bank is not allocated, the bank address read out from the bank address memory 911 is discarded, and an unused bank address is read out from the unused bank address memory 913. Then the multiplex data, the corresponding logical channel, and the unused bank address are transferred to the payload write controller 9102.

The payload write controller 102 receives the multiplex data, the logical channel and the bank address from the bank address read controller 9101, and writes the multiplex data onto the bank of the buffer memory 910 specified by the bank address.

The bank address write controller 9103 receives the logical channel and the bank address from the payload write controller 9102, updates the bank address, and then determines whether the cell assembly is completed or not. If the cell assembly is completed, the valid flag is set to invalid. If not, it is set to valid. Then, the bank address and the valid flag are written onto the bank address memory 911 according to the address uniquely determined by the logical channel number.

The assembly completion bank write controller 9104 receives the bank address and the valid flag from the bank address write controller 9103. If the valid flag is invalid, that is, the cell assembly is completed, then the bank address and the logical channel number are written onto the assembly completion bank address memory 914 in order to inform the cell transmission control unit 92 of the assembly completion of the relevant cell.

CELL TRANSMISSION CONTROL UNIT 92

The cell transmission detector 9201 determines at intervals of the cell transmission period whether the address of an assembly completion bank and its logical channel number have been written onto the assembly completion bank address memory 914 by the cell assembly control unit 91. If they have been written, the cell transmission instruction 9210 is transferred to the assembly completion bank read controller 9202. If not, the idle cell transmission instruction 9211 is transferred to the idle cell transmission controller 9206.

Upon receipt of the cell transmission instruction 9210 from the cell transmission detector 9201, the assembly completion bank read controller 9202 reads the address of the cell assembly completion bank and its logical channel number from the assembly completion bank address memory 914.

The header controller 9203 receives the address of the cell assembly completion bank and its logical channel number from the assembly completion bank read controller 9202, reads the cell header from the header memory 912 according to the address uniquely determined by the logical channel number, and outputs it to the cell output selector 9207.

The payload read controller 9204 receives the bank address from the header controller 9203, reads the payload data from the buffer memory 910 according to the bank address, and transfers it to the cell output selector 9207.

The transmission completion bank write controller 9205 writes the bank address indicating the bank from which the payload data has been read out by the payload read controller 9204 onto the unused bank address memory 913.

Upon receipt of the idle cell transmission instruction 9211 from the cell transmission detector 9201, the idle cell transmission controller 9206 emits an idle cell to the cell output selector 9207.

The cell output selector 9207 selects one of a cell header, payload data, and an idle cell. The cell header is selected when the header controller 9203 outputs it, the payload data is selected when the payload read controller 9204 outputs it, and the idle cell is selected when the idle cell transmission controller 9206 outputs it. The selected output is transferred to the clock converter 98 where the internal clock is converted to the ATM clock.

CELL ASSEMBLY OPERATION

The cell assembly operation is described with reference to the time charts of FIGS. 11 and 12. In the cell assembly, a time slot is allocated to each logical channel to allow the processing of multiplex data. In consequence, even if a cell assembly starts in all the channels within a single frame, each memory access becomes possible without contention. Although FIGS. 11 and 12 illustrate the operations varying with the logical channels, it should be noted that this is for simplifying the description and that the operation in each logical channel is nothing but a specific example.

At the beginning of the time slot allocated to each logical channel, a bank address and its valid flag is read from the bank address memory 911, and decision is made whether the valid flag is valid or not. If the bank address is valid, as shown by numerical 9300, the multiplex data is written onto the buffer memory 910, at the same time its bank address is updated. If the bank address is invalid, as shown by numerical 9301, the address indicating an unused bank is read from the unused bank address memory 913. According to the unused bank address, the multiplex data is written onto the buffer memory 910 as indicated by numeral 9303, while, as shown by numeral 9302, the bank address is updated. Further, when the cell assembly is completed, as shown by numeral 9304, the bank address and the logical channel are written onto the assembly completion bank address memory 914.

As illustrated in FIG. 12, even if assembly of a cell is completed in a logical channel and assembly of the subsequent cell is also completed, as shown by numeral 9400, the writing of multiplex data and the update/write of the bank address can be carried out concurrently. At the same time, as shown by numeral 9404, the bank address and the logical channel is written onto the assembly completion bank address memory 914. Also in the subsequent cell assembly, as shown by numeral 9401, the address indicating an unused bank is read from the unused bank address memory 913. According to the unused bank address, the multiplex data is written onto the buffer memory 910 as indicated by numeral 9403, while, as shown by numerical 9402, the bank address is updated.

CELL TRANSMISSION OPERATION

As illustrated in FIG. 13, for each cell output transmission cycle, the cell transmission detector 9201 emits a cell transmission instruction 9210 or an idle cell transmission instruction 9211. If the cell transmission instruction 9210 is emitted, as shown by numerical 9500, the bank address where the cell assembly is completed and its logical channel are read out from the assembly completion bank address memory 914. Thereafter, as showing by numeral 9502, according to the logical channel, the header is read out for transmission. Further, as shown by numeral 9503, the payload data is read out from the buffer memory 910 by the length of payload of a cell for transmission. After the payload data has been transmitted, the bank address now unused is written to the bank address memory 911. As shown by numeral 9501, when the idle cell transmission instruction 9211 is emitted, the idle cell transmission controller 9206 emits an idle cell.

By using the buffer memory 910 dynamically as described above to assemble ATM cells from fixed bit rate data on the TDM data highway, the necessary amount of the buffer memory can be minimized.

What is claimed is:

1. A multiprocessing system for disassembling asynchronous transfer mode (ATM) cells into multiplex data on a multiplex transmission line having a plurality of channels, comprising:

a buffer memory logically divided into a plurality of data banks, each bank being capable of storing the payload data of an ATM cell;

accumulation control means for specifying one unused bank of said buffer memory to store the payload data of a received ATM cell;

storage means for storing a collection of addresses of the banks, each storing the payload data of the received ATM cell, said collection being formed for each virtual channel of received ATM cells; and disassembly control means for reading out data as the multiplex data from said buffer memory according to a bank address read out from said collection for the virtual channel corresponding to each channel of the multiplex transmission line.

2. A multiprocessing system as set forth in claim 1, wherein said accumulation control comprises:

an unused bank address memory for retaining the addresses of the banks which are not used for cell disassembly;

memory control means for reading/writing an unused bank address from/onto said unused bank address memory; and data writing means for writing the payload data of an received ATM cell onto said buffer memory according to the unused bank address.

3. A multiprocessing system as set forth in claim 2, wherein said unused bank address memory retains said unused bank addresses in a queue, and said memory control means reads said unused bank address from the top of said queue and writes said unused bank address where the payload data has been read out by said disassembly control means onto the bottom of said queue in said unused bank address memory.

4. A multiprocessing system as set forth in claim 1, wherein said collection of bank addresses is comprised of a time series chain of bank addresses for each virtual channel of received ATM cells.

5. A multiprocessing system as set forth in claim 4, wherein said storage means comprises:

first storage means for retaining the address of the bank storing the payload data of the first ATM cell which is received earliest among the ATM cells stored in said buffer memory;

second storage means for retaining the address of the bank storing the payload data of the last ATM cell which is received latest among the ATM cells stored in said buffer memory; and third storage means for retaining the time series chain of bank addresses from the second ATM cell which reaches subsequent to the first ATM cell up to the last ATM cell.

6. A multiprocessing system as set forth in claim 1, wherein said multiplex transmission line comprises a time division multiplex transmission line and said disassembly control means specifies the virtual channel based on time slots of the multiplex transmission line.

7. A multiprocessing system for disassembling ATM (asynchronous transfer mode) cells into multiplex data on a multiplex transmission line having a plurality of channels, comprising:

a buffer memory logically divided into a plurality of banks, each bank being capable of storing the payload data of an ATM cell;

an unused bank address memory for retaining the addresses of the banks not used for cell disassembly;

payload data write control means for writing the payload data of an received ATM cell onto said buffer memory according to an unused bank address read out from said unused bank address memory;

address chain forming means for forming a bank address chain for each virtual channel of received ATM cells, said bank address chain comprising the addresses of the banks each storing the payload data of the received ATM cell;

disassembly control means for reading out data as the multiplex data from said buffer memory according to a bank address read out from the bank address chain of the virtual channel corresponding to each channel of the multiplex transmission line; and bank address write control means for writing the address of the bank from which the payload data has been read out by said disassembly control means onto said unused bank address memory.

8. A multiprocessing system for assembling ATM cells from multiplex data on a multiplex transmission line having a plurality of channels, comprising:

a buffer memory logically divided into a plurality of banks each being capable of storing the multiplex data on the multiplex transmission line;

first assembly control means for specifying the respective bank addresses of a collection of banks in said buffer memory corresponding to the virtual channels of ATM cells to store the multiplex data received from the multiplex transmission line;

second assembly control means for specifying an unused bank address when one of said banks specified by said first assembly control means stores the multiplex data in the payload length of an ATM cell to store the multiplex data; and transmission control means for forming an ATM cell to be transmitted by using the data read out from said bank where the multiplex data is stored in the payload length of an ATM cell.

9. A multiprocessing system as set forth in claim 8, wherein said second assembly control means comprises:

an unused bank address memory for retaining the addresses of the banks which are not used for cell assembly;

decision means for deciding which bank stores the multiplex data in the payload length of an ATM cell;

an assembly completion bank address memory for retaining the addresses of the banks decided by said decision means; and memory control means for reading/writing a bank address from/onto said unused bank address memory and said assembly completion bank address memory.

10. A multiprocessing system as set forth in claim 9, wherein said unused bank address memory retains said unused bank addresses in a queue, and said memory control means reads said unused bank address from the top of said queue and writes said bank address from which said data is read out by said transmission control means onto the bottom of said queue in said unused bank address memory.

11. A multiprocessing system as set forth in claim 9, wherein said assembly completion bank address memory retains said bank addresses in a queue, and said memory control means writes said bank address decided by said decision means onto the bottom of said queue and reads said bank address from the top of said queue to be transmitted.

12. A multiprocessing system for assembling ATM cells from multiplex data on a multiplex transmission line having a plurality of channels, comprising:

a buffer memory logically divided into a plurality of banks each capable of storing the multiplex data on the multiplex transmission line;

first assembly control means for specifying the respective bank addresses of a collection of banks in said buffer memory corresponding to the virtual channels of ATM cells to store the multiplex data received from the multiplex transmission line;

an unused bank address memory for retaining the addresses of the banks not used for cell assembly;

an assembly completion bank address memory for retaining the addresses of the banks each storing the multiplex data in the payload length of an ATM cell; and second assembly control means for specifying one of said unused bank addresses in said unused bank address memory as a new bank when the multiplex data is stored to said bank by the amount of the payload length of an ATM cell to store the multiplex data;

transmission control means for forming an ATM cell to be transmitted by using the data read out from said bank where the multiplex data is stored in the payload length of an ATM cell; and bank address control means for writing said bank address from which said data is read out by said transmission control means onto said unused bank address memory.

* * * * *